Patented Mar. 1, 1949

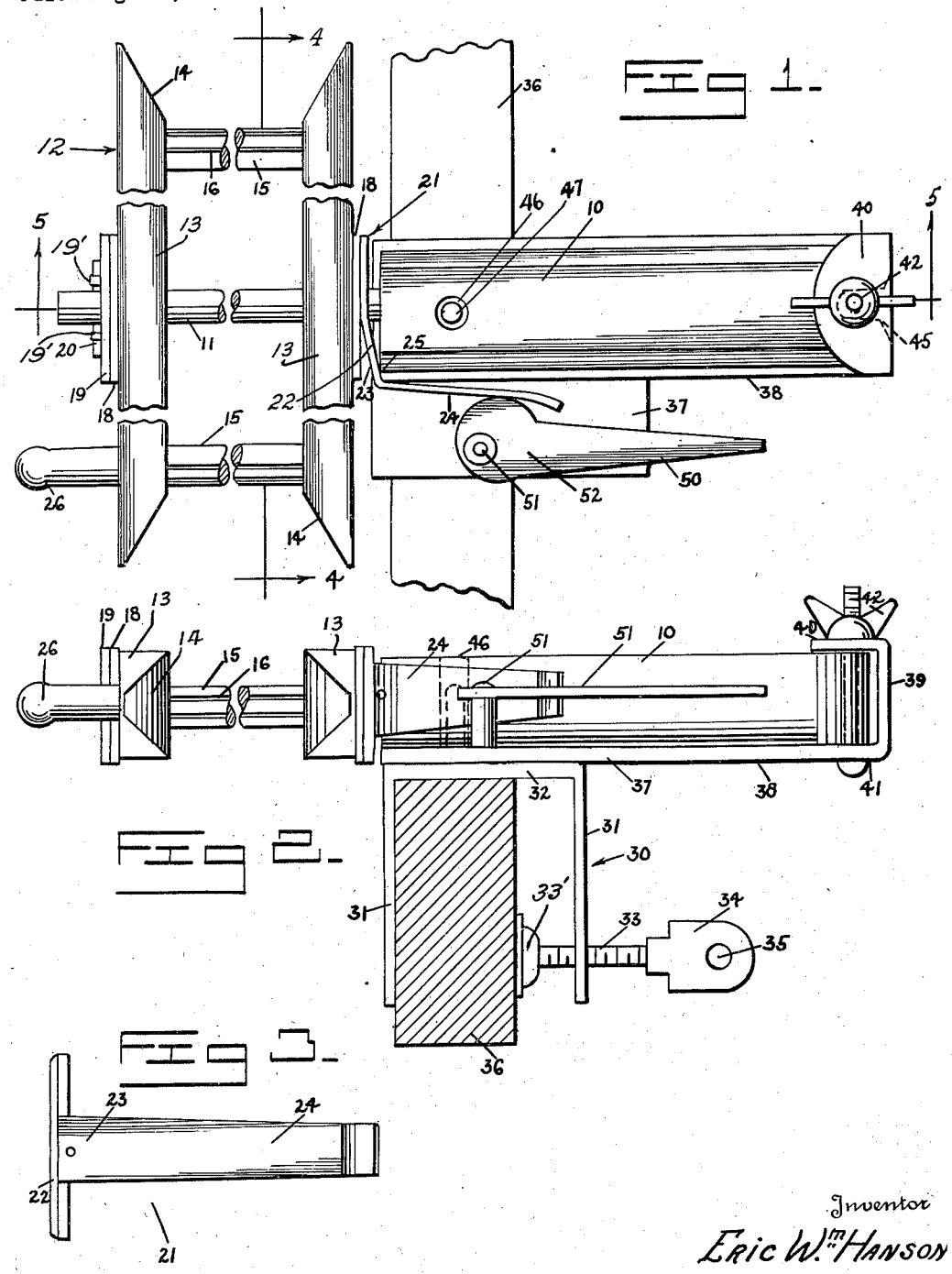

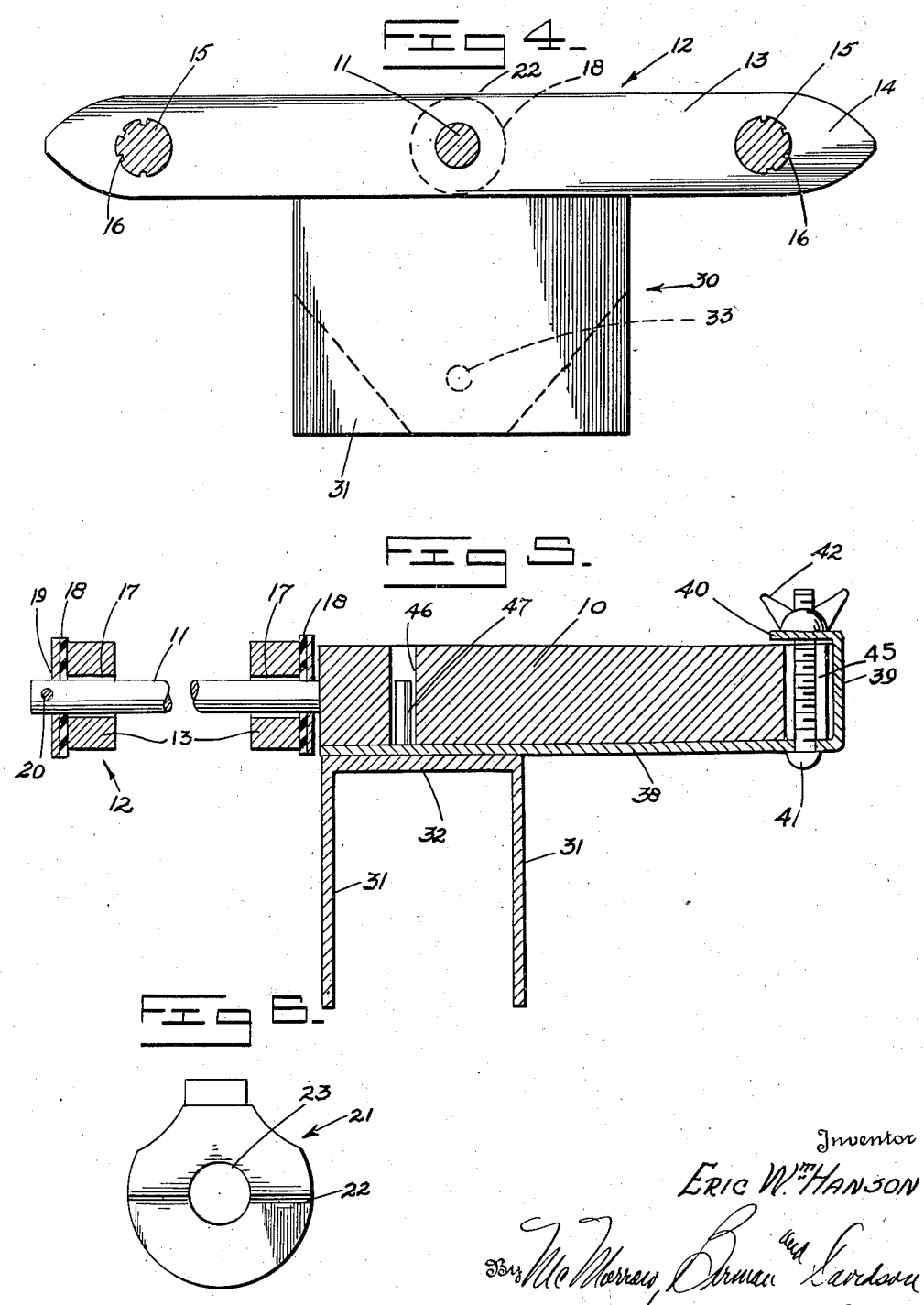

2,462,958

UNITED STATES PATENT OFFICE 2,462,958

FISHING REEL

Eric W. Hanson, Celoron, N. Y.

Application August 13, 1946, Serial No. 690,288

2 Claims. (Cl. 242—99)

This invention relates to a fishing reel and a clamp therefor.

A primary object of this invention is the provision of an improved fishing reel for trolling or the like provided with brake means, whereby the running out of the line, either during trolling, or after a strike, may be readily controlled.

An additional object of the invention is the provision of such a device characterized by brake means which may be set at a desired pressure to control the speed of unreeling of the line.

A further object of the invention is the provision of a mounting means or clamp for such a device, whereby the same may be supported from the gunwale of a boat or the like.

Still another object of the invention is the provision of such a reel provided with means, whereby the same may be readily rotated when carried by the support.

A still further object of the invention is the provision of means in association with such a reel to preclude the rotting of a line when the line is reeled thereon for storage.

Still other objects reside in the provision of such a reel and clamp which is sturdy and durable in construction, reliable and efficient in operation, and relatively simple and inexpensive to manufacture, assemble and utilize.

Other objects will in part be obvious and in part be pointed out as the description of the invention proceeds, in connection with the accompanying drawings, wherein there is disclosed a preferred embodiment of this inventive concept.

In the drawings:

Figure 1 is a top plan view, partially broken away, of one form of reel and clamp therefor embodying features of the instant invention.

Figure 2 is a side elevational view of the construction shown in Figure 1, the member on which the device is mounted being shown in section.

Figure 3 is an end elevational view of a constructional detail.

Figure 4 is a sectional view taken substantially along the line 4—4 of Figure 1, as viewed in the direction indicated by the arrows.

Figure 5 is a sectional view taken substantially along the line 5—5 of Figure 1, as viewed in the direction indicated by the arrows.

Figure 6 is a fragmentary end elevational view of the device disclosed in Figure 3.

Similar reference characters refer to similar parts throughout the several views of the drawings.

The reel of the instant invention includes a handle member 10, from one extremity of which extends an axle 11. Rotatably mounted on the axle 11 is a frame generally indicate at 12, and including two side pieces 13, beveled on their inner extremities, as at 14, to provide a guide for the fish line. The extremities of the members 13 are connected by transverse cylindrical rods 15, provided on their outer faces with grooves or channels 16, to provide air spaces in the surface against which the line will lie when coiled about the frame 14.

As best shown in Figure 5, each of the members 13 is provided with a bore 17, of slightly greater diameter than the axle 11, whereby the frame is freely rotatable about the axle. Friction washers 18 are positioned on opposite sides of the frame 12 about the axle 11, the outermost washer 18 secured, along with the frame assembly 12, on the axle by means of a washer 19 having apertured embossments 19' which are engaged by a cotter pin 20.

A brake member 21 including a disc 22 having a central aperture 23 therein adapted to surround the axle 11 is positioned between the other of the washers 18 and the extremity of the handle 10. Extending from the disc 22 is an angularly disposed portion 23 terminating in a finger 24 adapted, when pressed, to bear against the shoulder 25 at the extremity of the handle 10 in such manner as to bias the associated washer inwardly against the frame 12, compressing the frame 12 against the opposite washer, thus precluding rotation of the frame about the axle 11.

A handle member 26 is positioned adjacent one end of the outermost of the members 13 to facilitate rotation of the frame about the axle for the reeling of the line thereabout.

The clamp for the reel includes a yoke 30 including parallel depending arms 31 connected by a transverse portion 32, one of the arms being provided with an aperture through which extends a threaded member 33 provided with a cup washer 33', and also, with a head 34 and a transverse pin 35 for rotation of the head. The members 31 are adapted to be positioned on opposite sides of the gunwale 36 of a boat or a similar article, and the screw 33 rotated to securely clamp the yoke in position thereon. The yoke 30 supports a plate 37, including a longitudinally extending portion 38 terminating in an upstanding flange 39 having an inwardly extending re-entrant flange 40 at the upper extremity thereof. A bolt 41 is adapted to extend through aligned apertures in the member 38 of the flange 40, and is provided at its outer extremity with a wing nut 42.

The extremity of the handle 10 is provided with a slot 45 adapted to engage the bolt 41, and is also provided with an aperture 46 adapted to seat over a pin 47 extending upwardly from the plate 37. Thus, it will be seen that when the handle is positioned over the pin 47, the groove 45 is positioned about the bolt 41, and the lock nut 42 tightened, the handle will be held in relatively rigid related assembly with the plate 37, whereby the device may be clamped to the gunwale 36 of a boat as previously described.

A lever 50 is pivotally mounted, as on a pivot pin 51, to the plate 37 at a point adjacent the extremity 24 of the brake member 21. The end of the lever 50 terminates in an eccentric surface 52 adapted to abut the member 24, in such manner that rotation of the lever 50 to the position shown in Figure 1 will securely clamp the brake washers 18 about the frame 12 precluding rotation of the reel. Rotation of the lever 50 about the pivot 51 in a clockwise direction, as viewed in Figure 1, will progressively relieve the pressure on the lever 24, and consequently of the disc 22 on its associated washer 18, thus progressively decreasing the pressure on the reel until such time as the lever is substantially at right angles to the position shown, whereupon the reel may be freely rotated without braking pressure thereon.

From the foregoing it will now be seen that there is herein provided an improved fishing reel and clamp therefor which accomplishes all the objects of this invention, and others, including many advantages of great practical utility and commercial importance.

I claim:

1. In a device of the character described, a handle, an axle extending from said handle, a reel rotatably mounted upon the axle, friction washers surrounding said axle on opposite sides of said reel, a disc abutting one of said washers, a brake handle secured to said disc for forcing said washers against said reel, a clamp for said handle including a yoke adapted to be secured to a support, a plate carried by said yoke, a flange on said plate, means securing said handle to said plate and flange, and means on said plate for moving said brake handle including a pivotally mounted lever, and an eccentric carried by said lever abutting said brake handle.

2. A device of the character described, comprising a handle having a slot in one end and a transverse opening near its opposite end, an axle secured to the handle and extending axially thereof, a reel rotatably mounted upon the axle, friction elements mounted upon the axle and arranged upon opposite sides of the reel, a disc abutting one of the elements, a brake handle secured to the disc for forcing the elements against the reel, a mounting clamp for the first named handle including a yoke adapted to be secured to a support, a plate mounted upon the yoke and including an upstanding end carrying a flange spaced from the plate and substantially parallel thereto, an upstanding pin secured to the plate and engaging in the transverse opening, and a bolt connecting the plate and flange and engaging in the slot of the first named handle.

ERIC WM. HANSON.

REFERENCES CITED

The following references are of record in the file of this patent:

UNITED STATES PATENTS

| Number | Name | Date |
| --- | --- | --- |
| 560,295 | Pflueger | May 26, 1896 |
| 1,081,435 | Covington | Dec. 16, 1913 |
| 1,490,349 | Stromberg | Apr. 15, 1924 |
| 1,656,464 | Auren | Jan. 17, 1928 |